(No Model.)
F. A. GOOCH.
PROCESS OF PRODUCING HYDROUS CHLORID OF ALUMINIUM.
No. 558,725. Patented Apr. 21, 1896.
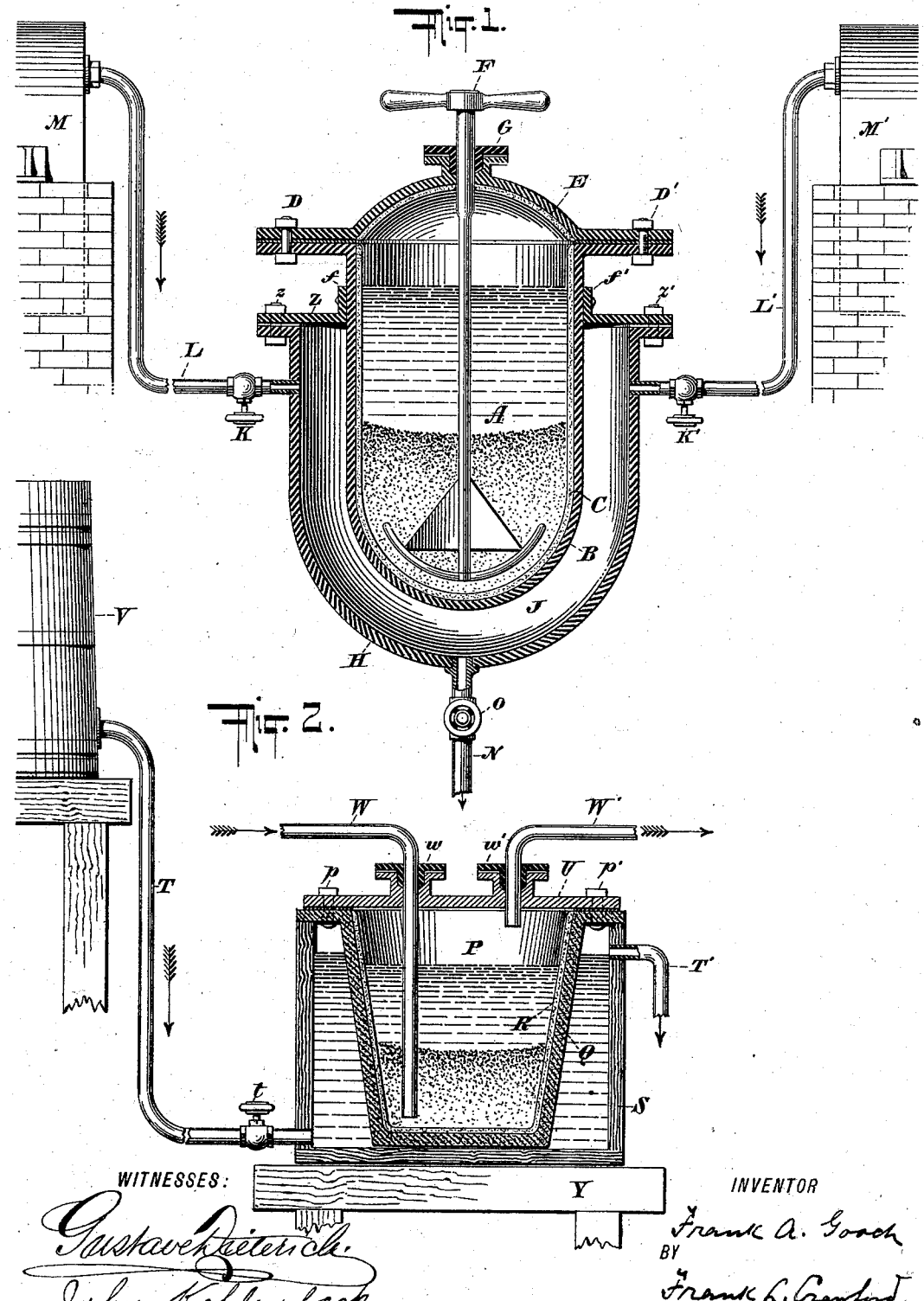

UNITED STATES PATENT OFFICE.

FRANK A. GOOCH, OF NEW HAVEN, CONNECTICUT, ASSIGNOR TO THE WALDO FOUNDRY, OF BRIDGEPORT, CONNECTICUT.

PROCESS OF PRODUCING HYDROUS CHLORID OF ALUMINIUM.

SPECIFICATION forming part of Letters Patent No. 558,725, dated April 21, 1896.

Application filed October 26, 1895. Serial No. 566,948. (No specimens.)

*To all whom it may concern:*

Be it known that I, FRANK A. GOOCH, of the city of New Haven, in the county of New Haven and State of Connecticut, have invented certain new and useful Improvements in Processes for Producing the Hydrous Chlorid of Aluminium; and I do hereby declare the following to be a full, clear, and exact description of the invention, such as will enable others skilled in the art to which it appertains to make and use the same.

My invention relates more particularly to the production of the hydrous crystalline chlorid of aluminium represented by the chemical formula $Al_2Cl_6 12H_2O$. This substance is used in the arts for various purposes—as, for example, in the improved process for reducing aluminium described and claimed in Letters Patent No. 527,851, granted to Leonard Waldo and myself October 23, 1894; but the methods usually employed for producing it are relatively expensive.

My invention has for its object the easy and inexpensive production of the said substance.

In general terms my invention comprises the improved process herein described for producing hydrous aluminium chlorid, which consists in treating a suitable aluminous material with dilute hydrochloric acid, separating the resulting solution by filtration from the undissolved residue, introducing into the solution gaseous hydrochloric acid, and separating out the resulting precipitate. I preferably employ as the aluminous material bauxite or clay; but my invention is applicable to any suitable aluminous material capable of being dissolved in dilute hydrochloric acid.

Hydrous aluminium chlorid, which is extremely insoluble in concentrated hydrochloric acid, is very soluble in dilute hydrochloric acid of about half strength. (Specific gravity about 1.10.) For this reason I find that hydrochloric acid of half strength is a valuable agent for the extraction of aluminium salts from aluminous material soluble in such acid, and that the solution obtained by treating such aluminous material with the said acid of half strength (after filtration or other separation of insoluble matter) is in a condition readily to deposit, in the form of the hydrous crystalline chlorid, the aluminum contained in the solution by simply saturating the solution in the cold with hydrochloric-acid gas. I preferably form the solution in a sealed gas-tight vessel, heating the mixture preferably to a temperature at or about that of boiling water.

More particularly, therefore, my invention consists in the improved process herein described for producing hydrous aluminium chlorid, which consists in treating a suitable aluminous material with dilute hydrochloric acid of about half strength, the mixture being suitably heated under pressure in a suitable closed vessel, separating the resulting solution by filtration from the undissolved residue, introducing into the solution gaseous hydrochloric acid, and separating out the resulting precipitate.

For convenience I will describe my invention as applied to the production of the hydrous crystalline chlorid of aluminium from bauxite, it being understood that the process is equally applicable to the treatment of other suitable aluminous materials which are dissolved by dilute hydrochloric acid.

The bauxite is first reduced to a fine powder by any suitable crushing process. The powdered bauxite is then treated with hydrochloric acid of about half strength, (specific gravity 1.10,) the acid and bauxite being inclosed in a suitable closed gas-tight vessel and heated to a temperature at or above that of boiling water. The vessel may be any suitable vessel strong enough to withstand the pressure of the steam and hot acid and lined with some suitable material capable of resisting the action of the hot acid. A suitable vessel would be any iron steam-digester fitted with a bolted cover and lined with acid-proof enamel. The vessel should be of such limited size that the digestion shall take place under strong pressure produced by confining the gas and steam until the action is complete. The time necessary for the digestion will vary somewhat according to the amount of heat employed. After the action is complete the resulting mixture will contain hydrous aluminium chlorid and ferric chlorid in solution, together with an undissolved residue consisting of silica of the bauxite and a certain amount of undecomposed bauxite, and perhaps other foreign matter. This undissolved residue is then filtered out by means of a pressure-filter, vacuum-filter, centrifugal machine, or other suitable device. Care must be taken not to employ acid of too great strength. If acid of full strength or nearly full strength be employed, some of the hydrous aluminium chlorid in the bauxite tends to crystallize out and form an insoluble crust of such chlorid upon the undecomposed ore, which would tend to act as a mechanical protection to prevent thorough decomposition of the ore. On the other hand I have found that hydrochloric acid of approximately half strength is an almost perfect solvent for the hydrous aluminium chlorid, and consequently that it greatly facilitates the decomposition of the aluminous material when heated under pressure, as described above. Should acid of too great strength have been employed in the first instance, it is only necessary to add water in amount sufficient to cause the solution of all the aluminium chlorid. The undissolved residue which has been filtered out can, if desired, be treated again in the same manner by the dilute acid heated, as before, under pressure, for the purpose of more perfectly extracting the aluminium chlorid.

Into the solution obtained as above, after the undissolved residue has been filtered out and the solution has been allowed to cool, hydrochloric acid is introduced in a gaseous form under atmospheric conditions of temperature and pressure and to or nearly to the point of saturation. When the hydrochloric acid has been thus introduced in sufficient quantity, a white precipitate is formed which settles or may be filtered out, and which is shown by analysis to be the hydrous crystalline chlorid of aluminium ($Al_2Cl_6 12H_2O$) in a comparatively pure state. The salts of iron and other impurities soluble in strong hydrochloric acid remain in the solution. The hydrous chlorid of aluminium thus obtained may be washed in strong hydrochloric acid, (specific gravity not less than 1.20,) and if further purification is desired it may be dissolved in water and further precipitated by again passing the hydrochloric-acid gas into the solution. From the salt as first obtained in the process described other hydrous chlorids of aluminium may be obtained by process of drying.

From the mother-liquor remaining after the hydrous chlorid of aluminium has been precipitated and from the washings the hydrochloric acid may in large measure be recovered by known methods, preferably by distillation, and used over again in further repetitions of the process, thus adding greatly to its economy. In the process of distillation of the acid liquors one portion of hydrochloric acid is recovered in gaseous form ready for use in precipitating more chlorid from the solution of the aluminium salts in the dilute acid, and another portion is recovered in a half-strength solution of the acid suitable for use in extracting more of the aluminium chlorid from the aluminous material. The hydrochloric acid recovered is therefore practically all recovered in a form immediately utilizable for the repetition of the steps of the process.

Any suitable apparatus may be employed in my process. In the drawings, which are hereby made a part of this specification, I have shown one suitable form of apparatus, described as follows:

Figure 1 is a cross-section of a suitable apparatus employed by me for decomposing the aluminous material by digesting the same with dilute hydrochloric acid under pressure. Fig. 2 is a cross-section of a suitable apparatus employed by me for precipitating the crystalline hydrous chlorid of aluminium from the solution obtained in the first part of the process by saturating the same with hydrochloric-acid gas.

In Fig. 1, H is an iron steam-digester, in which J is the steam-chamber, into which the steam is admitted by cocks K K' in pipes L L', which pipes conduct the steam from boilers or steam-chests M M'. B is an inner vessel of iron, lined with acid-proof enamel C. A is the chamber within the inner vessel B, in which chamber A is placed the powdered bauxite or other aluminous material, together with the hydrochloric acid of half strength. The steam is withdrawn from the chamber J through the pipe N by means of the cock O. The inner vessel B is held in place by an annular bonnet or lid Z, bolted to a circular lip or flange projecting from the rim of the outer vessel by bolts $z\ z'$, the said annular bonnet or lid Z itself having flanges $f\ f'$, which are bolted fast to the sides of the inner vessel J. E is a gas-tight cover lined with acid-proof enamel and bolted fast to flanges projecting from the rim of the inner vessel J by bolts D D'. F is a stirrer used to agitate the aluminous material, so as to subject it more fully to the action of the dilute hydrochloric acid. Said stirrer passes through the cover E, making there a tight joint with the cover by means of a stuffing-box G. The powdered bauxite or other aluminous material having been placed in the chamber A, together with the dilute acid, steam is admitted into the steam-chamber J, and the mixture is heated to the temperature of boiling water and kept at about that temperature until the action is complete. The gas and steam generated by the heat will produce the desired pressure. The whole apparatus above described may be supported in any suitable way.

In Fig. 2, S is a wooden tank having support Y. Water from any convenient supply V flows through pipe T, and is admitted by a cock $t$ into the bottom of the tank S and flows out of the tank at the surface of the water through the pipe T'. Q is a tank or vessel of convenient material having an acid-proof earthenware lining R. P is the chamber in the vessel Q, into which is placed the solution of the aluminous material obtained in the first part of the process. U is a cover clamped to the vessel Q by bolts $p\ p'$. Through the said cover enter pipes W W', surrounded by stuffing-boxes $w\ w'$ to make the joints tight. The hydrochloric-acid gas is introduced through the pipe W, passing down to the bottom of the solution, and after the solution is saturated the excess of gas passes off through the pipe W'. The precipitated hydrous chlorid is shown in the bottom of the chamber P. The water in the tank S serves to keep the contents of the chamber P cold.

Having described my invention, what I claim as new, and desire to secure by Letters Patent, is—

1. The improved process herein described for producing hydrous chlorid of aluminium, which consists in treating a suitable aluminous material with dilute hydrochloric acid, separating the resulting solution by filtration from the undissolved residue, introducing into the solution gaseous hydrochloric acid and separating out the resulting precipitate, substantially as described.

2. The improved process herein described for producing hydrous aluminium chlorid which consists in treating a suitable aluminous material with dilute hydrochloric acid of about half strength, separating the resulting solution by filtration from the undissolved residue, introducing into the solution gaseous hydrochloric acid to the point of saturation, and separating out the resulting precipitate, substantially as described.

3. The improved process herein described for producing hydrous aluminium chlorid, which consists in treating a suitable aluminous material with dilute hydrochloric acid of about half strength the mixture being suitably heated under pressure in a suitable closed vessel, separating the resulting solution by filtration from the undissolved residue, introducing into the solution gaseous hydrochloric acid to the point of saturation, and separating out the resulting precipitate, substantially as described.

4. The improved process herein described for producing hydrous aluminium chlorid, which consists in treating bauxite with dilute hydrochloric acid of about half strength, suitably heated under pressure in a suitable closed vessel, separating the resulting solution from the undissolved residue by filtration, introducing into the solution gaseous hydrochloric acid to the point of saturation, separating out the precipitated hydrous aluminium chlorid, and washing the same with concentrated hydrochloric acid, substantially as described.

5. The improved process herein described for producing hydrous aluminium chlorid which consists in treating bauxite with dilute hydrochloric acid of about half strength heated under pressure in a suitable closed vessel to about the temperature of boiling water under atmospheric conditions, then separating the resulting solution by filtration from the undissolved residue, introducing into the filtered solution gaseous hydrochloric acid to the point of saturation, separating out the precipitated hydrous aluminium chlorid, washing the same with concentrated hydrochloric acid and recovering the hydrochloric acid from the mother-liquor and the washings, substantially as described.

FRANK A. GOOCH.

Witnesses:
PHILIP E. BROWNING,
ISAAC K. PHELPS.